(12) United States Patent
Kitsukawa

(10) Patent No.: US 8,388,279 B2
(45) Date of Patent: Mar. 5, 2013

(54) DRILLING TOOL

(75) Inventor: Takahiro Kitsukawa, Kawasaki (JP)

(73) Assignee: Tungaloy, Corporation, Fukushima (JP)

( * ) Notice: Subject to any disclaimer, the term of this patent is extended or adjusted under 35 U.S.C. 154(b) by 858 days.

(21) Appl. No.: 12/494,494

(22) Filed: Jun. 30, 2009

(65) Prior Publication Data

US 2010/0003097 A1    Jan. 7, 2010

(30) Foreign Application Priority Data

Jul. 1, 2008   (JP) .................................. 2008-171988

(51) Int. Cl.
*B23B 51/00*   (2006.01)
(52) U.S. Cl. .............................. 408/67; 408/58; 408/207
(58) Field of Classification Search .................... 408/56, 408/58, 57, 61, 67, 207–209, 703; 175/393, 175/417–420.1
See application file for complete search history.

(56) References Cited

U.S. PATENT DOCUMENTS

| | | | | |
|---|---|---|---|---|
| 2,969,846 A | | 1/1961 | Sandvig | |
| 3,162,255 A | * | 12/1964 | McCarty | 175/213 |
| 3,694,099 A | * | 9/1972 | Nicholas | 408/58 |
| 4,243,113 A | * | 1/1981 | Kleine | 175/420.1 |
| 4,515,230 A | * | 5/1985 | Means et al. | 175/420.1 |
| 5,487,630 A | * | 1/1996 | Campian | 409/225 |
| 6,065,908 A | * | 5/2000 | Kleine et al. | 408/67 |
| 6,189,633 B1 | * | 2/2001 | Kleine et al. | 175/418 |
| 7,563,060 B2 | * | 7/2009 | Kesterson et al. | 408/67 |
| 2009/0000441 A1 | * | 1/2009 | Hasebe et al. | 83/53 |
| 2009/0060670 A1 | | 3/2009 | Sugano et al. | |
| 2010/0166510 A1 | * | 7/2010 | Inamasu et al. | 407/11 |

FOREIGN PATENT DOCUMENTS

| | | | | |
|---|---|---|---|---|
| DE | 3143847 | A | * | 5/1983 |
| JP | 06055401 | A | * | 3/1994 |
| JP | 09-272118 | | | 10/1997 |
| JP | 2012024864 | A | * | 2/2012 |

OTHER PUBLICATIONS

Official action dated Dec. 18, 2012 issued in Japanese counterpart application (No. 2008-171988) with translation.

* cited by examiner

*Primary Examiner* — Daniel Howell
(74) *Attorney, Agent, or Firm* — Womble Carlyle

(57) ABSTRACT

There is provided a drilling tool having a substantially columnar tool body to be rotated around an axial line, a cutting edge located at a front end portion of the tool body, and a chip suction hole which is formed inside the tool body in a direction of the axial line for sucking chips generated by the cutting edge. The chip suction hole has a main hole portion extending toward a drill base along the axial line, a narrow hole portion located at a front end of the main hole portion, the narrow hole portion having a cross section smaller than that of the main hole portion and a suction opening located at a front end of the narrow hole portion and opened in the vicinity of the cutting edge, the suction opening having a cross section larger than that of the narrow hole portion.

19 Claims, 9 Drawing Sheets

DRILLING TOOL

This application claims the benefit of Japanese Patent Application No. 2008-171988, filed Jul. 1, 2008, which is hereby incorporated by reference herein in its entirety.

BACKGROUND OF THE INVENTION

1. Field of the Invention

The present invention relates to a drilling tool, and in particular, to a drilling tool suitable for drilling process in which powdery and fine chips are generated at drilling.

2. Description of the Related Art

In recent years, composite materials such as glass fiber reinforced plastics (GFRP) or carbon fiber reinforced plastics (CFRP) have been in the spot light as materials having light weight and high strength. Composite materials have been used in various fields such as motor cycles, automobiles, railways, construction industries and medical care, including aerospace industries.

When performing cutting work in which such a composite material is used as a work piece, harmful powder dusts containing glass fibers, carbon fibers or the like are possibly generated due to the cutting. Therefore, an improvement in an operational environment is demanded.

On the other hand, there is known a concrete boring drill equipped with a dust suction hole for concrete powder dust suction extending through a drill body in an axial line thereof. A concrete boring drill described in Japanese Patent Laid-Open No. H09-272118(1997) is provided with a drill body and a tip which is embedded and fixed in a front end of the body on a diameter line to be arranged in such a manner that a front end portion and both side portions of the tip protrude from the body. The tip is formed in a flat-plate shape and an outer periphery at one end side of the flat surface is formed in a mountain shape. A dust suction hole extending through the body in the axial line is branched in a Y-letter shape at the front end portion to both sides of the tip, and both the branch ends are opened to be in positions substantially equal to rear edges of both the side portions or closer to the front end than the rear edges in a plan view of the tip.

However, in the drill disclosed in Japanese Patent Laid-Open No. H09-272118(1997), the dust suction hole is opened at a position away from the front end portion of the chip toward the side portion rear edge of the tip. Therefore, in cutting work generating powdery chips, chips generated by a cutting edge located at the front end portion of the tip possibly scatter without being sucked. Since the dust suction hole has an equal diameter until the front end portion thereof, a suction force gets the weaker as an opening of the dust suction hole is away from suction means, and therefore, the suction performance is not sufficient.

The present invention is made in view of the foregoing problems, and an object of the present invention is to provide a drilling tool which can restrict scattering of chips even in a case of performing cutting work in which powdery and fine chips are generated.

SUMMARY OF THE INVENTION

For achieving the above object, the present invention is provided with a drilling tool comprising a substantially columnar tool body to be rotated around an axial line, a cutting edge located at a front end portion of the tool body, and a chip suction hole which is formed inside the tool body in a direction of the axial line for sucking chips generated by the cutting edge, wherein the chip suction hole comprises a main hole portion extending toward a tool base along the axial line, a narrow hole portion located at a front end of the main hole portion, the narrow hole portion having a cross section smaller than that of the main hole portion, and a suction opening located at a front end of the narrow hole portion and opened in the vicinity of the cutting edge, the suction opening having a cross section larger than that of the narrow hole portion.

It is preferable that in the present invention, an inner diameter of the main hole portion is within a range of 40% to 80% of a diameter of the tool body.

It is preferable that in the present invention, a shape of the suction opening has a funnel form.

In the present invention, at least one groove may be formed on an outer periphery of the tool body so as to permit outside air to be taken in during drilling. The at least one groove may be provided along the direction of the axial line.

Further features of the present invention will become apparent from the following description of exemplary embodiments (with reference to the attached drawings).

DESCRIPTION OF THE EMBODIMENTS

Hereinafter, an embodiment of a drilling tool in the present invention will be explained with reference to FIGS. 1 to 4.

Figure 1:
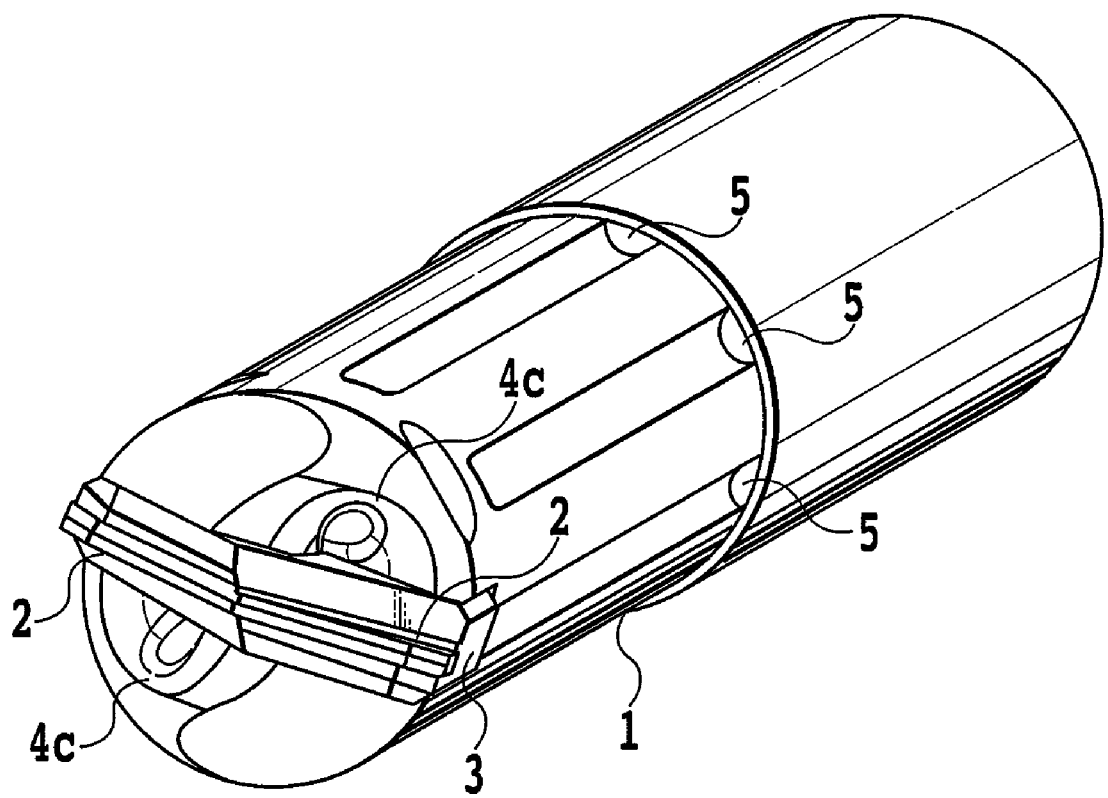
FIG. 1 is a perspective view showing an indexable insert drill according to an embodiment of the present invention.
Figure 2:
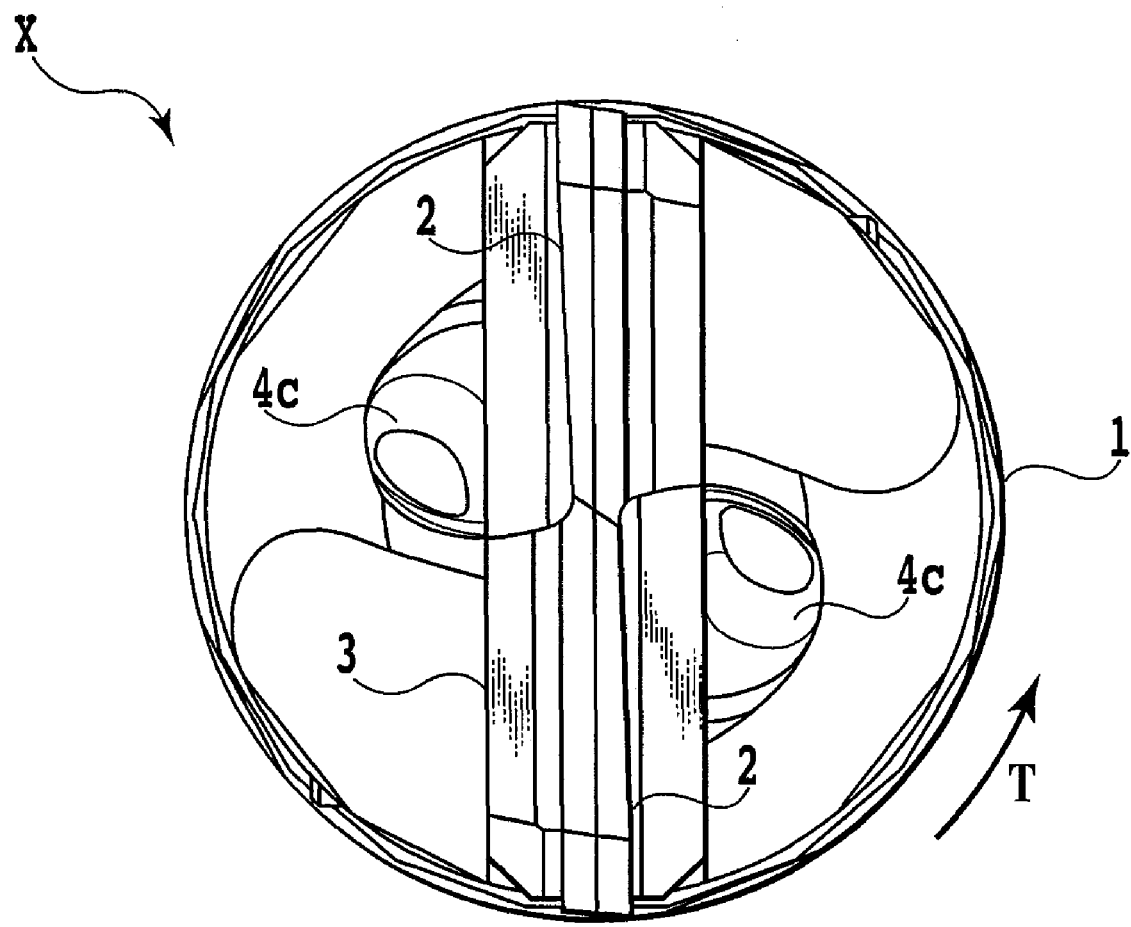
FIG. 2 is a front view showing the indexable insert drill shown in FIG. 1.

An indexable insert drill according to the present invention is a two-edge throwaway drill and is, as shown in FIGS. 1 to 3, provided with a drill body 1, and a cutting insert 3, or a throwaway tip, mounted detachably in a front end portion of the drill body 1 as having cutting edges 2.

The drill body 1 is constructed of chrome molybdenum steel, high-speed tool steel, stainless steel, cemented carbide, cermet, ceramic or the like. The drill body 1 is substantially columnar around an axial line O and is provided with a chip suction hole 4 formed at the central portion so as to penetrate in a direction of the axial line O direction for sucking chips, and grooves 5 formed on an outer periphery so as to extend in a direction of the axial line O. A front end portion of the drill body 1 is provided with an insert mounting seat for mounting the cutting insert 3, and screw holes.

Figure 3A:
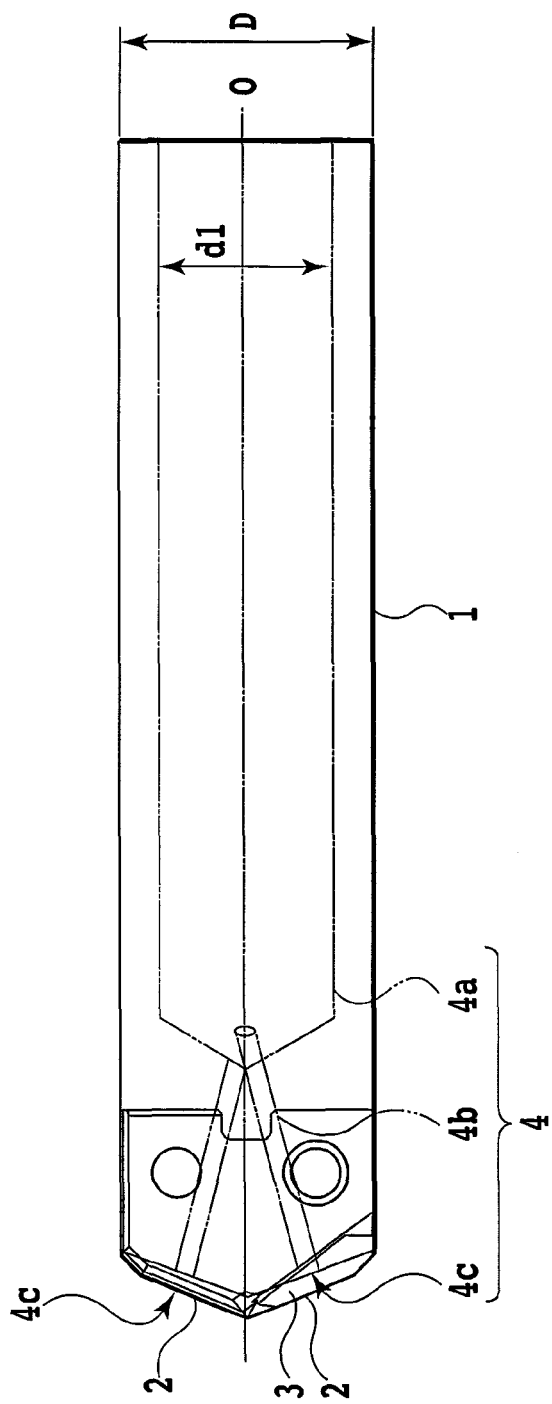
FIG. 3A is a right side view showing the indexable insert drill shown in FIG. 1.
Figure 4:
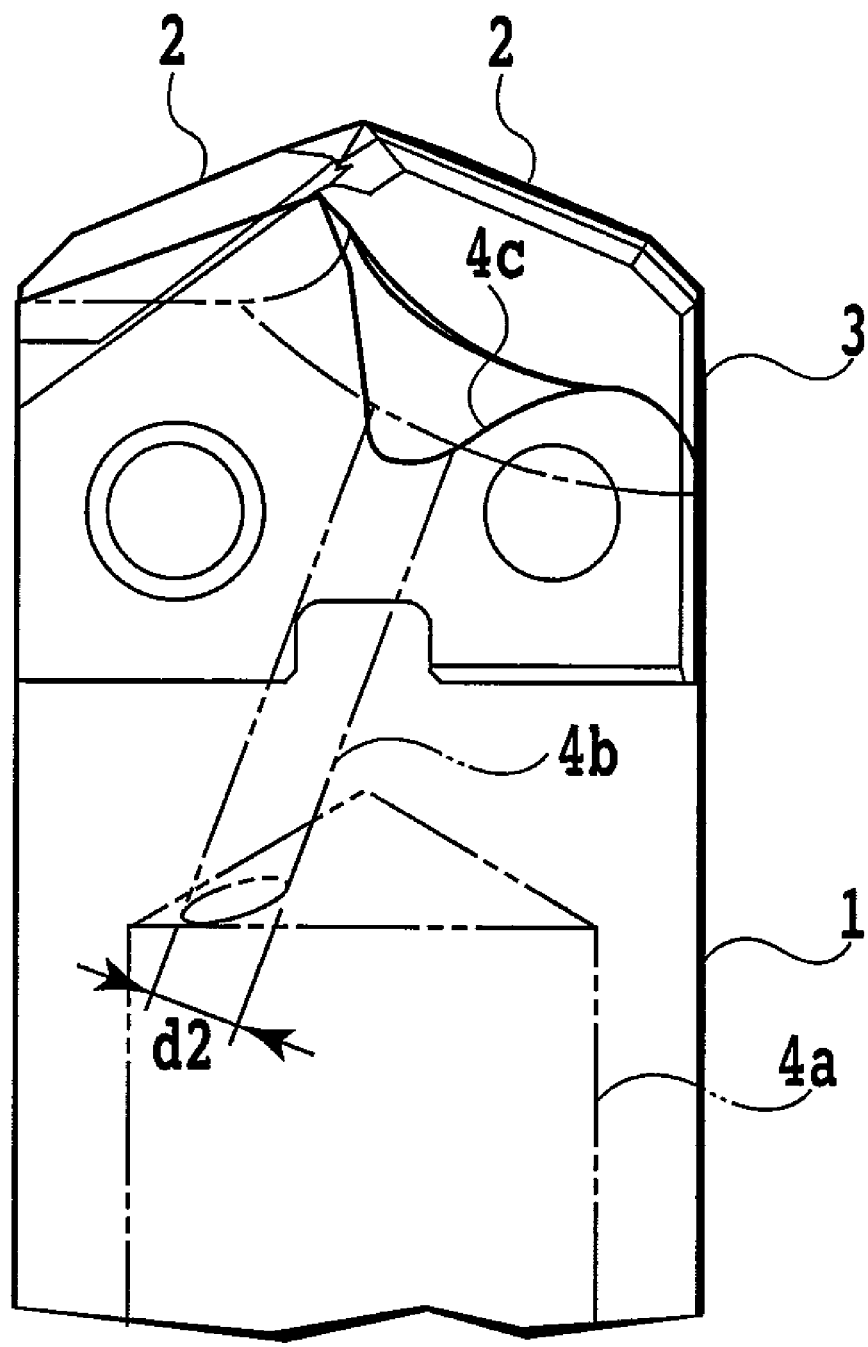
FIG. 4 is an X arrow view in FIG. 2.

The chip suction hole 4 is, as shown in FIG. 3A and FIG. 4, constructed of a main hole portion 4a, two narrow hole portions 4b branched from a front end of the main hole portion 4a to the direction of the front side of the drill body 1, and suction openings 4c that are formed integrally with a front end of the narrow hole portions 4b. A suction tube (not shown) is connected to a proximal or base side of the chip suction hole 4, which is connected via the suction tube to a dust suction device (not shown) equipped with a suction pump and a dust collector.

The main hole portion 4a is formed so as to extend toward the drill proximal end along the axial line O, and has an inner diameter d1 which is set within a range of 40% to 80% of a drill diameter D, for example, as approximately 70% of the drill diameter D.

The two narrow hole portions 4b are formed so as to linearly extend toward the respective central portions of the two cutting edges 2 in a direction intersecting the axial line O, and has an inner diameter d2 which is smaller than that of the main hole portion 4a and is set within a range of 10% to 50% of the diameter d1 of the main hole portion 4a, for example, as 15% to 30% of the diameter d1.

The suction opening 4c is formed in a funnel shape in such a manner that a diameter thereof is gradually reduced from an entrance for outside air toward the narrow hole portion 4b, and is formed in a trumpet shape as having a smooth curved surface of which an entrance for outside air having a diameter larger than that of the narrow hole portion 4b, in an arc shape to bend backward to an outside. The suction opening 4c is formed in a substantially semi circular shape in a drill front end view. An end portion at the front end of the suction opening 4c is connected smoothly to a front end surface of the drill body 1 and is opened at the front end of the drill body 1 near the cutting edges 2 so as to be exposed to the cutting edges 2 from a rake face side orienting the forward side in a T direction of drill rotation.

Figure 3B:
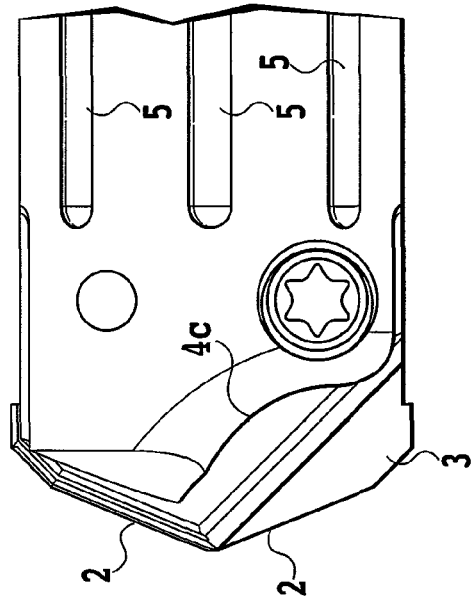
FIG. 3B is an enlarged right side view showing a front end portion of the indexable insert drill shown in FIG. 1.

The grooves 5 are, as shown in FIGS. 1 and 3B, formed to extend linearly from the front end toward the proximal end over the entire drill, and eight grooves 5 are provided with substantially equal intervals in a circumferential direction. A cross-section of the groove 5 is substantially arc-shaped.

The cutting insert 3 may be constructed of cemented carbide, cermet, ceramic, ultra-high pressure sintered body or the like. The insert 3 is formed in a substantially pentangular flat plate shape and two cutting edges 2 are formed in a section ridge of a mountain-shaped portion on the pentangular surface in such a manner as to be symmetrical to a center line passing a peak of the mountain-shaped portion. Two mounting holes, penetrating in a tip-thickness direction, are formed in the cutting insert 3. The mountain-shaped portion is formed in a substantially isosceles triangle, and the apex angle thereof corresponds to a front end apex angle of the drill is set as 135° for example. A width of the cutting insert 3 vertical to the center line of the mountain-shaped portion is set equal to, or slightly larger than, an outer diameter of the drill body 1. The cutting insert 3 is seated at the insert mounting seat of the drill body 1 so that the mountain-shaped portion protrudes, and the mounting screw is threaded into the screw hole through the mounting hole to make the center line of the mountain-shaped portion correspond to the axial line O, thus detachably mounting the cutting insert 3 to the front end portion of the drill body 1.

The indexable insert drill as constructed above is mounted to a main spindle of a machine tool and is fed to a front end side in a direction of the axial line O while being rotated around the axial line O, thereby getting in contact with a work piece to be used for drilling work.

At the time of drilling work, the suction pump (not shown) is operated, so that outside air is sucked through a flow passage between an inner periphery of a processed hole and an outer periphery of the drill body 1 from the suction opening 4c, is introduced into the chip suction hole 4, and is sucked through the suction tube to the suction pump, thereby generating a negative pressure in the chip suction hole 4. In consequence, chips generated at the time of drilling work are sucked into the chip suction hole 4, are sent to the proximal side of the drill body 1 along a flow of sucked outside air, and are trapped by a dust collector (not shown).

An operation of the indexable insert drill according the present embodiment as constructed above will be explained below.

According to the indexable insert drill of the present embodiment, outside air is sucked through the flow passage between the inner periphery of the processed hole and the outer periphery of the drill body 1 to the suction opening 4c by the suction force of the suction pump, is introduced into the chip suction hole 4, and is sucked through the suction tube to the suction pump. In consequence, sucking the chips generated at the time of drilling work through the chip suction hole 4 with the flow of the outside air causes the chips to be discharged through the suction tube to the proximal end side of the drill body 1 and to be trapped by the dust collector. As a result, scattering of the chips can be prevented in a case of drilling work which is likely to generate powdery and fine chips.

Since the chips are sucked and discharged through the chip suction hole provided in the drill body 1, the inner surface of the processed hole is not damaged by contact of the chips therewith. Therefore, the present embodiment is excellent in process accuracy, for example, in surface roughness.

According to the indexable insert drill in the present embodiment, the outside air taken in from the two suction openings 4c respectively is narrowed in flow by the two narrow hole portions 4b each having a diameter smaller than that of the suction opening 4c. Thereafter, the air in the two narrow hole portions 4b is merged at the main hole portion 4a having a diameter larger than that of the narrow hole portion 4b, and is sucked into the proximal side of the drill body 1. At this time, when the air flows in the narrow hole portion 4b having a narrowed flow passage, a so-called Venturi effect is generated to increase a flow speed of the outside air, thus reducing the pressure. This reduction in pressure promotes the flow of the air from the suction hole portion 4c of the high-pressure side to the main hole portion 4a of the low-pressure side, thereby enabling an increase in suction force. As a result, chips can be efficiently sucked to be discharged to the proximal side of the drill body 1. Further, even if a depth of the processed hole is long, the discharge force would not become too weak at the proximal side of the drill body 1 and as a result, the chips would not remain therein.

Unlike known chip suction holes using conventional oil holes, the present embodiment comprises a main hole portion 4a having a inner diameter d1 which is set as having, for example, approximately 70% of the drill diameter D. Therefore, pressure loss at sucking the chips by the suction pump can be minimized to improve a suction efficiency. Further, chip clogging can be prevented by thus increasing the hole diameter of the main hole portion 4a to smoothly discharge the chips.

Since the suction opening 4c provided near the cutting edge is opened to be exposed to the entire cutting edge 2 from the rake face side orienting a forward side of T direction of drill rotation toward a cutting point direction, chips generated by the cutting edge 2 can be efficiently sucked.

Figure 5:
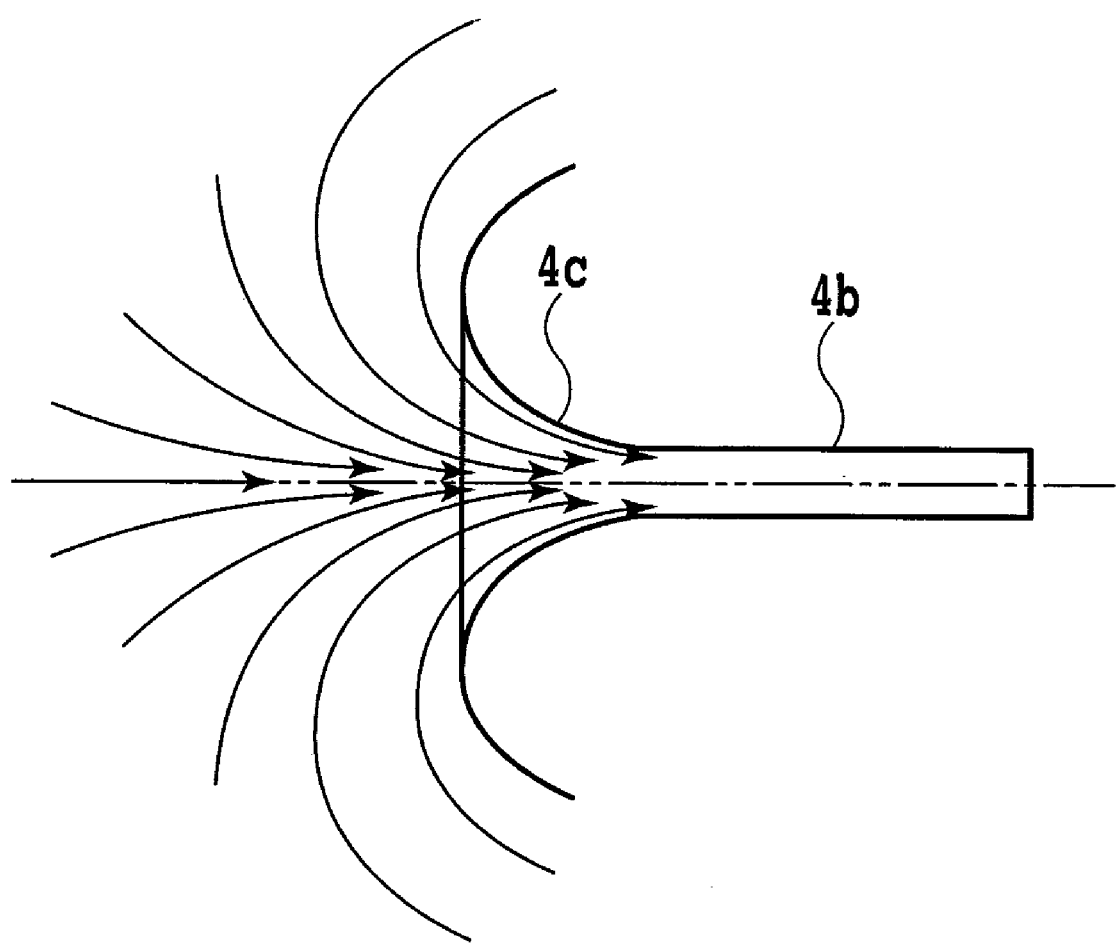
FIG. 5 is a diagram explaining a suction state near a suction opening of the indexable insert drill shown in FIG. 1.

Since the suction opening 4c is formed in a funnel shape in such a manner that its diameter is gradually reduced from the entrance for the outside air toward the narrow hole portion 4b, resistance in sucking can be reduced to improve the suction efficiency. Such a funnel shape of the suction opening 4c enables outside air to be collected and sucked from the outside of the suction opening 4c to the narrow hole portion 4b. Besides, outer end of the suction opening, which is an entrance for the outside air, is formed in a substantially trumpet shape as having a smooth, curved surface, of which the outer end is curved back in an arc shape to the outside. Therefore, a flow of the outside air is not disturbed in the entrance of the outer periphery in the suction opening 4c and, as shown in FIG. 5, is controlled in such a manner as to be sucked in from the outside along the shape of the suction opening 4c to be smoothly sucked. In consequence, since a laminar flow of the outside air sucked near the suction opening 4c results in covering a range to the front end outer periphery side of the drill body 1, powdery and fine chips which may be spread to the front end outer periphery by a centrifugal force due to rotation of the drill can be sucked with this laminar flow.

Figure 9:
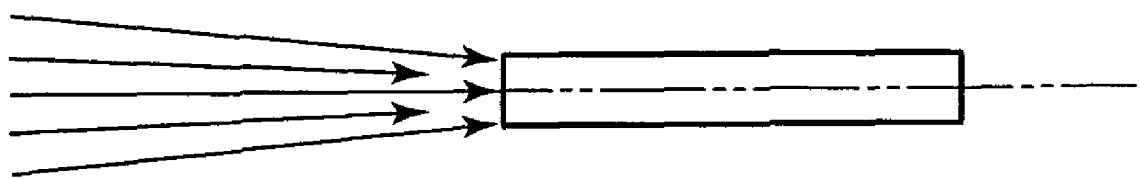
FIG. 9 is a diagram explaining a conventional suction state.

Contrastively, in a conventional drilling tool in which a cylindrical front end opening is used simply as a suction opening as it is, a suction direction of outside air to be sucked is, as shown in FIG. 9, limited to one specific direction. Therefore, the conventional drilling tool can not suck chips existing in the front end outer periphery side of the drill body 1.

Therefore, since the indexable insert drill according to the present embodiment is excellent in suction force and can certainly suck and trap chips, the indexable insert drill has an advantage that, particularly in a case of performing drilling process using a composite material such as glass fiber reinforced plastics (GFRP), carbon fiber reinforced plastics (CFRP) as a workpiece material, scattering of chips can be prevented to improve a working environment.

Further, according to the indexable insert drill in the present embodiment, since the grooves 5 are provided in the outer periphery of the drill body 1 to extend along the direction of axial line O, flow passage is secured between the inner periphery of the processed hole and the grooves 5. As a result, the outside air can be stably taken in from the opening of the processed hole, thereby supplying a sufficient amount of air to the suction opening 4c. This prevents an event that the processed hole becomes in a vacuum state to air-tightly close a space between the processed hole and the drill body 1, preventing outside air from flowing in from the opening of the processed hole.

Number and shape of the narrow hole portion 4b are not limited to those in the present embodiment and one may adopt a different arbitrary number and shape. Number and shape of the suction opening 4c are not limited to those in the present embodiment and one may adopt a different arbitrary number and shape.

Figure 6A:
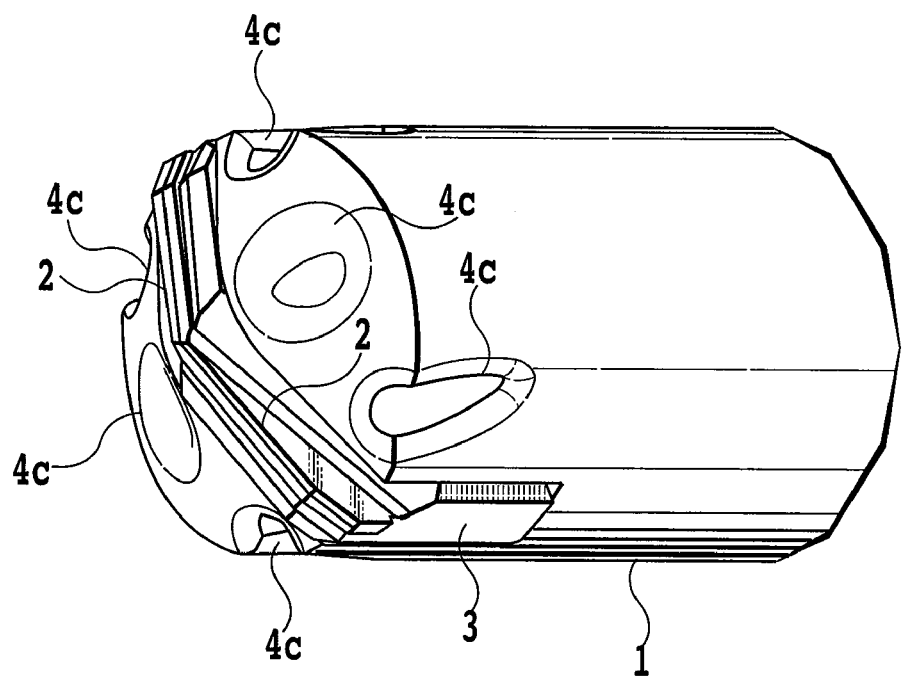
FIG. 6A is an enlarged perspective view showing a front end portion of an indexable insert drill of a modified embodiment of the present invention.
Figure 6B:
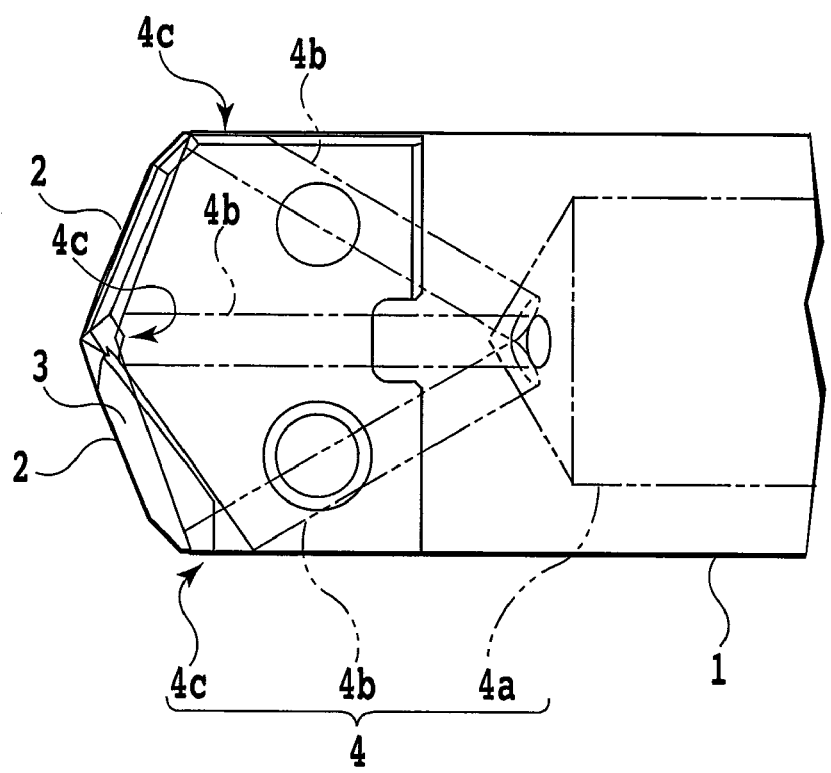
FIG. 6B is a right side view showing a front end portion of the indexable insert drill of the modified embodiment.

For example, as shown in FIGS. 6A and 6B, six narrow hole portions 4b may be radially provided and also suction openings 4c may be provided not only in the front end of the drill body 1, but also in the outer periphery thereof. In this way, for example, in a case of applying the drilling tool to an end mill equipped with a peripheral cutting edge, chips generated by the peripheral cutting edge can be also sucked efficiently.

Figure 7A:
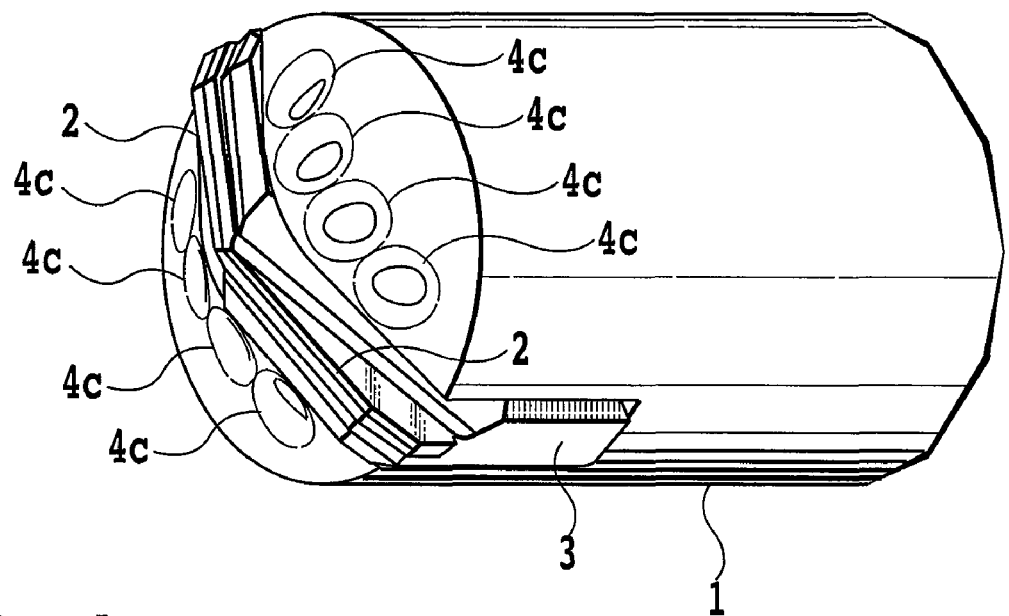
FIG. 7A is an enlarged perspective view showing a front end portion of an indexable insert drill according to another modified embodiment of the present invention.
Figure 7B:
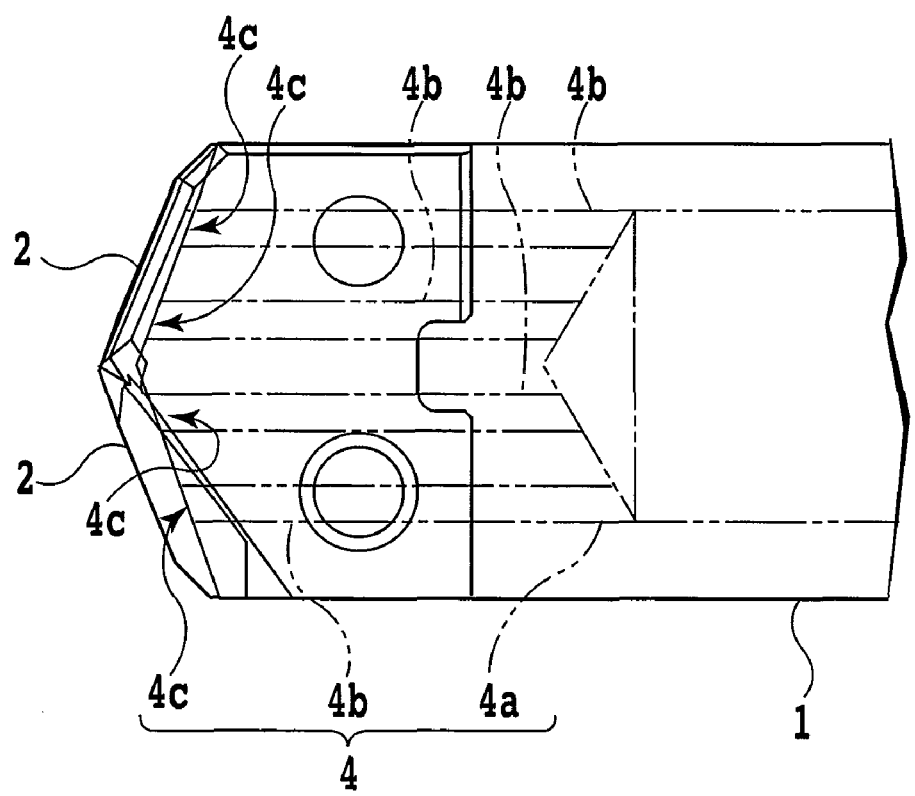
FIG. 7B is a right side view showing a front end portion of an indexable insert drill according to the another modified embodiment.

As shown in FIGS. 7A and 7B, eight narrow hole portions 4b extending in parallel with the axial line O may be provided, and also suction openings 4c, each having a substantially circular shape in a drill front end view, may be provided.

Figure 8A:
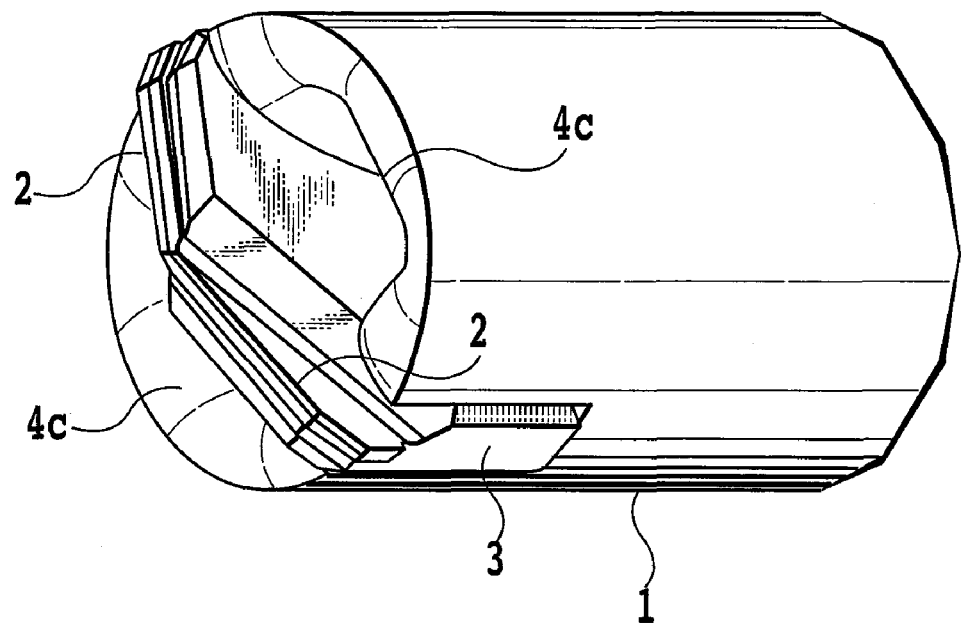
FIG. 8A is a perspective view showing an embodiment modified in the suction openings.

As shown in FIG. 8A, a suction opening 4c may be provided to be opened not only to the rake face side orienting the forward side of the T direction of the drill rotation, but also to the flank side orienting the backward side of the T direction of the drill rotation so as to be exposed to the entire mountain-shaped portion of the cutting insert 3.

Figure 8B:
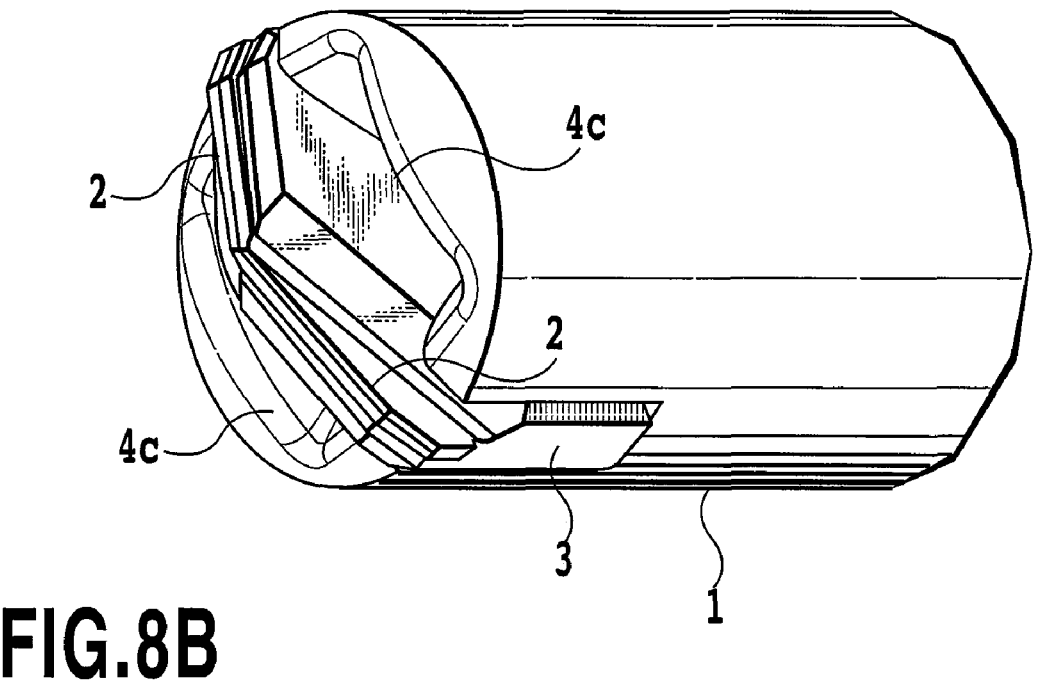
FIG. 8B is a perspective view showing another embodiment modified in suction openings.

As shown in FIG. 8B, a suction opening 4c formed in a substantially rectangular shape in a drill front end view may be provided.

In the indexable insert drill according to the present embodiment, the inner diameter d1 of the main hole portion 4a is set to approximately 70% of the drill diameter D, but the inner diameter d1 of the present invention is not limited to approximately 70%. Setting the inner diameter of the main hole portion 4a to an arbitrary dimension within a range of 40% to 80%, and 50% to 70% more preferably, of the drill diameter D allows an improvement of a suction efficiency and prevention of chip clogging. It is desirable to set the inner diameter of the main hole portion 4a as large as possible, but it has a limitation in view of maintaining rigidity. Cross sections of a main hole portion 4a, narrow hole portions 4b, and suction openings 4c are not necessarily circular.

In the indexable insert drill according to the present embodiment, the inner diameter d2 of the narrow hole portion 4b is not particularly limited, but it is preferable to set the inner diameter d2 of the narrow hole portion 4b within a range of 10% to 50% of the diameter d1 of the main hole portion 4a.

In the indexable insert drill according to the present embodiment, the eight grooves extending linearly in the axial line O direction are provided at the outer periphery of the drill body 1 with substantially equal intervals therebetween in the circumferential direction, but the groove(s) may adopt an arbitrary shape which can secure a flow passage for taking in the outside air from the opening of the processed hole, and therefore may adopt a different arbitrary construction. For example, the cross section of the groove 5 may be substantially quadrangular or substantially triangular instead of a substantially arc shape. Further, the number of the groove(s) 5 may be set to an arbitrary number corresponding to the diameter D of the drill body 1.

In the present embodiment, the drilling tool according to the present invention is explained by taking a indexable insert drill with two cutting edges as an example, but instead of this, the present invention may be applied to a different drilling tool such as a drill with one cutting edge, a solid drill, a tipped drill, a gun drill, an end mill, a milling cutter, or a reamer.

In the present embodiment, the cutting insert 3 is explained by taking a substantially pentangular flat plate shape as an example, but a shape of the cutting insert 3 is not particularly limited and may adopt an arbitrary shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A drilling tool comprising:
a substantially columnar tool body to be rotated around an axial line;
a cutting edge located at a front end portion of the tool body; and
a chip suction hole which is formed inside the tool body in a direction of the axial line for sucking chips generated by the cutting edge, wherein:
the chip suction hole comprises:
   a main hole portion extending toward a tool base along the axial line;
   a narrow hole portion located at a front end of the main hole portion, the narrow hole portion having a cross section smaller than that of the main hole portion; and
   a suction opening located at a front end of the narrow hole portion and opened in the vicinity of the cutting edge, the suction opening having a cross section larger than that of the narrow hole portion, wherein:
at least one groove is provided on an outer periphery of the tool body so as to permit outside air to be taken in during drilling.

2. A drilling tool according to claim 1, wherein:
an inner cross section of the main hole portion is within a range of 40% to 80% of a cross section of the tool body.

3. A drilling tool according to claim 1, wherein:
the suction opening is formed in a funnel shape.

4. A drilling tool according to claim 1, wherein:
said at least one groove is formed along a direction of the axial line.

5. A drilling tool comprising:
a substantially columnar tool body to be rotated around an axial line;
a cutting edge located at a front end portion of the tool body; and
a chip suction hole which is formed inside the tool body in a direction of the axial line for sucking chips generated by the cutting edge, wherein:
the chip suction hole comprises:
   a main hole portion extending toward a tool base along the axial line;
   a narrow hole portion located at a front end of the main hole portion and extending toward a central portion of the cutting edge, the narrow hole portion having a cross section smaller than that of the main hole portion; and
   a suction opening located at a front end of the narrow hole portion and having a cross section larger than that of the narrow hole portion, the suction opening being opened in the vicinity of the cutting edge and exposed to a rake surface side of the cutting edge.

6. The drilling tool according to claim 5, wherein:
the suction opening is exposed to an entire rake surface of the cutting edge.

7. The drilling tool according to claim 5, wherein:
the suction opening is formed in a substantially semi-circular shape, in a front end view of the tool.

8. The drilling tool according to claim 5, wherein:
an outer end of the suction opening is curved back in an arc shape.

9. The drilling tool according to claim 5, wherein:
a cross sectional area of the suction opening is gradually reduced from an entrance for outside air towards the narrow hole portion.

10. The drilling tool according to claim 5, wherein:
the suction opening is exposed to an entire rake surface of the cutting edge;
the suction opening is formed in a substantially semi-circular shape, in a front end view of the tool;
an outer end of the suction opening is curved back in an arc shape; and
a cross sectional area of the suction opening is gradually reduced from an entrance for outside air towards the narrow hole portion.

11. A drilling tool comprising:
a substantially columnar tool body to be rotated around an axial line;
a cutting edge located at a front end portion of the tool body; and
a chip suction hole which is formed inside the tool body in a direction of the axial line for sucking chips generated by the cutting edge, wherein:
the chip suction hole comprises:
   a main hole portion extending toward a tool base along the axial line;
   at least six narrow hole portions, each narrow hole portion located at a front end of the main hole portion, the narrow hole portion having a cross section smaller than that of the main hole portion; and
   at least six associated suction openings, at least some of which are provided in an outer periphery of the drill body, each suction opening located at a front end of the narrow hole portion and opened in the vicinity of the cutting edge, the suction opening having a cross section larger than that of the narrow hole portion.

12. A drilling tool comprising:
a substantially columnar tool body to be rotated around an axial line;
a cutting edge located at a front end portion of the tool body; and
a chip suction hole which is formed inside the tool body in a direction of the axial line for sucking chips generated by the cutting edge, wherein:
the chip suction hole comprises:
   a main hole portion extending toward a tool base along the axial line;
   at least eight narrow hole portions, each narrow hole portion located at a front end of the main hole portion and having a cross section smaller than that of the main hole portion; and
   at least eight associated suction openings, each having a substantially circular shape in a drill front end view, each suction opening located at a front end of an associated narrow hole portion and opened in the vicinity of the cutting edge, each suction opening having a cross section larger than that of the associated narrow hole portion.

13. The drilling tool according to claim 1, wherein:
the cutting edge belongs to a cutting insert which extends across a width of a front end portion of the drilling tool; and
the suction opening is opened to both:
   the cutting edge's rake face side orienting the forward side of the direction of the drill rotation; and
   an associated flank side orienting the backward side of the direction of the drill rotation.

14. A drilling tool comprising:
a substantially columnar tool body to be rotated around an axial line;
at least two cutting edges located at a front end portion of the tool body; and
a chip suction hole which is formed inside the tool body in a direction of the axial line for sucking chips generated by the cutting edges, wherein:

the chip suction hole comprises:
- a main hole portion extending toward a tool base along the axial line;
- a narrow hole portion associated with each cutting edge, each narrow hole portion located at a front end of the main hole portion and having a cross section smaller than that of the main hole portion, each narrow hole portion extending toward a central portion of an associated cutting edge; and
- a suction opening associated with each cutting edge, each suction opening located at a front end of the narrow hole portion and having a cross section larger than that of the narrow hole portion, each suction opening being opened in the vicinity of the cutting edge and exposed to a rake surface side of an associated cutting edge.

15. The drilling tool according to claim 14, wherein:
each suction opening is exposed to an entire rake surface of an associated cutting edge.

16. The drilling tool according to claim 14, wherein:
each suction opening is formed in a substantially semi-circular shape, in a front end view of the tool.

17. The drilling tool according to claim 14, wherein:
an outer end of each suction opening is curved back in an arc shape.

18. The drilling tool according to claim 14, wherein:
a cross sectional area of each suction opening is gradually reduced from an entrance for outside air towards an associated narrow hole portion.

19. The drilling tool according to claim 14, wherein:
the suction opening is exposed to an entire rake surface of the cutting edge;
the suction opening is formed in a substantially semi-circular shape, in a front end view of the tool; and
an outer end of the suction opening is curved back in an arc shape.

* * * * *